A. F. ENGLERTH.
BALL BEARING.
APPLICATION FILED SEPT. 24, 1917.

1,280,002.

Patented Sept. 24, 1918.

Witness:
E. Jacker

Inventor:
Anton F. Englerth.
By Charles Turner Brown,
Atty.

UNITED STATES PATENT OFFICE.

ANTON F. ENGLERTH, OF CHICAGO, ILLINOIS, ASSIGNOR TO SOFUS J. CHRISTENSEN AND ANDREW BANDURA, BOTH OF CHICAGO, ILLINOIS.

BALL-BEARING.

1,280,002.   Specification of Letters Patent.   Patented Sept. 24, 1918.

Application filed September 24, 1917.   Serial No. 192,878.

*To all whom it may concern:*

Be it known that I, ANTON F. ENGLERTH, a subject of the King of Hungary, and a resident of Chicago, in the county of Cook and State of Illinois, have invented certain new and useful Improvements in Ball-Bearings, of which the following, when taken in connection with the drawing accompanying and forming a part hereof, is a specification.

This invention relates to ball bearings wherein the balls are separated from each other, by constructions termed cages, or separators, and particularly to a bearing having individual separators and in which the balls come in contact with the raceways of the device and with their respective separators.

One of the objects of the invention is to obtain a ball bearing of the kind named which is provided with individual separators of which a considerable portion of the periphery of the walls of adjacent separators will be in contact.

A further object is to obtain a ball bearing of the kind named in which the balls and separators may be jointly inserted in the raceways thereof without the use of force, and in which there is nevertheless no liability of the balls leaving the raceways.

Another object is to obtain separators adapted to be used in a bearing of the kind named which are economically made from flat metal sheets.

Additional objects are set forth in this specification and disclosed in the claims.

In the drawings referred to, Figure 1, is a side elevation of a ball bearing embodying this invention.

Figure 1:
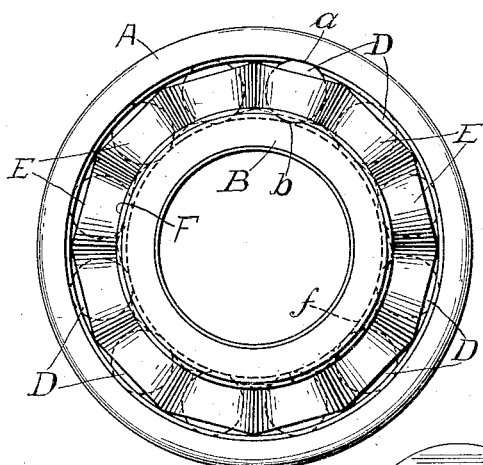

A reference character applied to designate a given part indicates said part throughout the several figures of the drawing, wherever the same appears.

A and B are rings respectively provided with raceways $a$ and $b$. C, C' are recesses extending from raceways $a$ and $b$, respectively, to the ends of the rings A, B. These recesses C, C' are used to insert some of the balls in raceways $a$, $b$, in assembling the several parts of the device. D are balls. E are separators, and ball retainers.

Figure 2:
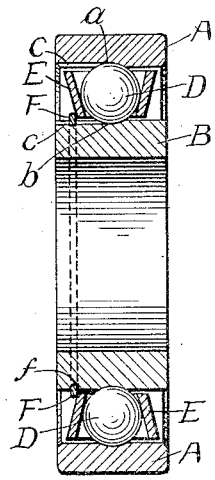
Fig. 2 is a vertical section of the bearing illustrated, on line 2—2 of Fig. 1, viewed in the direction indicated by the arrows.
Figure 3:
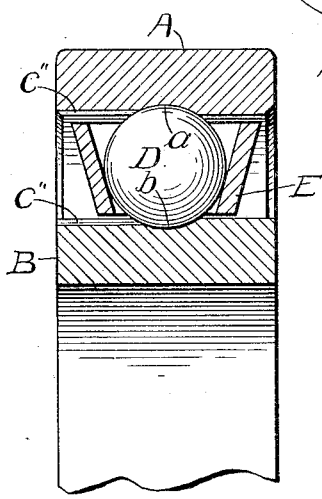
Fig. 3, is an enlarged vertical section of one side of the bearing on line 2—2 of Fig. 1, illustrating a modification of the bearing which is illustrated in said Figs. 1 and 2.
Figure 4:
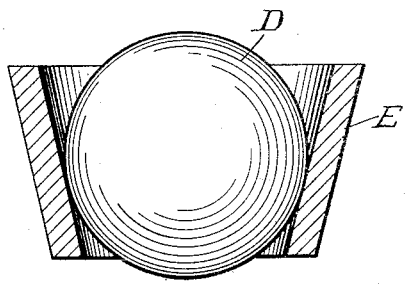
Fig. 4, is a vertical section of a separator forming an element of the bearing illustrated in Figs. 1, 2 and 3 and a side elevation of a ball in said separator.

In Fig. 3 the recesses C'', corresponding with the recesses C C' in Figs. 1 and 2, do not extend to the center of the raceway $b$, thereby requiring force in placing the last one of the balls D, (in its separator E), in the bearing, in assembling the several parts thereof.

F, Figs. 1 and 2 is a spring ring, and $f$ is a groove positioned to one side of the raceway $b$, on the periphery of inner ring B. In the construction which is illustrated in Figs. 1 and 2 the thickness of the spring F, the position of the groove $f$, and the thickness of the walls of the separators E, are so related that when the several parts of the device are assembled the peripheral walls of said separators are closed to contact with the side or edge of the spring ring F which is adjacent thereto. The balls turn readily in said separators but with no substantial play between said balls and said separators and hence said balls are maintained in said raceways $a$, $b$, as the balls move by the recesses C, C', in the operation of the bearing, by said contact of said separators with the adjacent side or edge of said spring ring.

Figure 6:
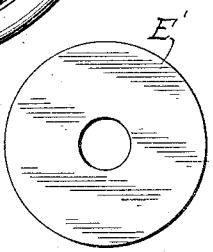
Fig. 6 is a top plan view of the sheet metal blank from which the separators of the device are formed or punched up.
Figure 5:
Fig. 5 is a vertical section of a modification of the separator which is illustrated in Figs. 1 to 4.

The separators E are formed in or by an ordinary punch press from the flat sheet metal blank E' which is illustrated in Fig. 6 of the drawing, and comprise the conically shaped cylindrical walls $e$, which in the modification illustrated in Fig. 5, are curved inwardly a slight distance at the small ends thereof, as is indicated by the portion thereof which is designated by the letter $e'$. The length of the separators E is less than the distance between the rings A, B, and so much less than the diameter of the balls contained therein that said balls project therefrom sufficiently to travel in the raceways, $a$, $b$, with the ends of the separators not in contact with said rings A. B; and the conical walls of the separators approach each other so that the smaller ends of said separators insure the support of said separators on said balls, in the travel of the balls in the raceways, $a$, $b$, when the weight of said balls is on the outer ring. That is, when a given ball is below the center of the bearing, and particularly when said ball is vertically beneath said center, the separator containing said ball rests on and is carried by the ball, so that the end of said separator which is adjacent to the outer ring does not rest on, to be carried by, said outer ring.

In the modification which is illustrated in Fig. 5, the slightly curved smaller end of the separator rests on the balls when said balls are below the center of the bearing, as above set forth.

The separators E being carried by the balls D, as above set forth, are so near to contact with the outer ring A that a slight turning of the separators on the balls would bring either the forward or the rear portion of the edge of the larger ends of the separators into contact with said outer ring, in the use of the bearing and the contact of the conical walls of adjacent separators prevents said turning being so great as to impair the efficiency of the bearing.

In assembling the parts of the device rings A, B are placed substantially concentric and some of the balls, with the ball separators inclosing them, are placed in the raceways $a$, $b$, and the remainder of the balls (while in their respective separators) are, in the construction illustrated, in Figs. 1 and 2, dropped through the recesses C, C' into said raceways, $a$, $b$, and, in the construction illustrated in Fig. 3, are forced through raceways C'', C'' and into raceways $a$, $b$. In said first named construction the spring ring F is then forced over the periphery of inner ring B and into groove $f$.

The balls turn freely in their respective separators and hence when a ball is forced against its separator said separator transmits the thrust thereon to adjacent separators, but the balls in said adjacent separators do not receive any of said thrust.

I claim;

1. A ball bearing, comprising an inner and an outer ring respectively provided with raceways, balls arranged to travel in said raceways, in combination with individual separators respectively consisting of conically shaped walls mounted on said balls, with the axes of said separators and the faces of adjacent ones thereof on radial lines of said rings.

2. A ball bearing, comprising an inner and an outer ring respectively provided with raceways, balls arranged to travel in said raceways, in combination with individual separators respectively consisting of conically shaped walls mounted on said balls, with the faces of adjacent ones of said separators on radial lines of said rings and adapted to be in contact when above the center of the bearing, and said separators adapted to be carried by said balls when positioned below said center.

3. A ball bearing, comprising an inner and an outer ring respectively provided with raceways, balls arranged to travel in said raceways, in combination with individual separators on said balls, said separators respectively consisting of conically shaped walls having the smaller ends thereof turned inward toward said balls, and with the faces of adjacent ones of said separators on radial lines of said rings.

4. A ball bearing, comprising an inner and an outer ring respectively provided with raceways, and with recesses extending substantially to the center of said raceways, balls arranged to travel in said raceways, in combination with individual separators respectively consisting of conically shaped walls mounted on said balls, with the faces of adjacent ones of said separators on radial lines of said rings and adapted to be in contact when above the center of the bearing, and said separators adapted to be carried by said balls when positioned below said center, and means to hold said separator in line to prevent said balls entering said recesses, from said raceways.

ANTON F. ENGLERTH.

In the presence of—
S. J. L. CHRISTENSEN,
CHARLES TURNER BROWN.